(12) United States Patent
Osama et al.

(10) Patent No.: US 12,051,952 B2
(45) Date of Patent: Jul. 30, 2024

(54) ELECTRIC MACHINE

(71) Applicant: General Electric Company, Schenectady, NY (US)

(72) Inventors: Mohamed Osama, Garching (DE); Jose Maria Rey Villazon, Ismaning (DE); Thomas Helmut Ripplinger, Weichs (DE)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/162,785

(22) Filed: Feb. 1, 2023

(65) Prior Publication Data
US 2023/0187990 A1    Jun. 15, 2023

Related U.S. Application Data

(63) Continuation of application No. 17/007,064, filed on Aug. 31, 2020, now Pat. No. 11,581,772.

(51) Int. Cl.
| *H02K 3/24* | (2006.01) |
| *H02K 3/22* | (2006.01) |
| *H02K 9/10* | (2006.01) |
| *H02K 9/19* | (2006.01) |

(52) U.S. Cl.
CPC .............. *H02K 3/24* (2013.01); *H02K 3/22* (2013.01); *H02K 9/10* (2013.01); *H02K 9/19* (2013.01)

(58) Field of Classification Search
CPC .. H02K 3/24; H02K 3/22; H02K 9/10; H02K 9/19; H02K 1/165; H02K 1/20; H02K 3/04; H02K 3/28; H02K 15/02

USPC .......................................................... 310/53
See application file for complete search history.

(56) References Cited

U.S. PATENT DOCUMENTS

| 5,808,386 | A | 9/1998 | Willyoung |
| 6,628,020 | B1 | 9/2003 | Tong |
| 8,408,282 | B2 | 4/2013 | Brand et al. |
| 10,014,740 | B2 | 7/2018 | Bialik et al. |
| 10,048,019 | B2 | 8/2018 | Karlen et al. |
| 10,347,957 | B2 | 7/2019 | Raith et al. |
| 10,454,329 | B2 | 10/2019 | Schweinert |
| 11,781,821 | B2 * | 10/2023 | Yun ........................... F28F 1/40 165/109.1 |
| 2014/0327330 | A1 * | 11/2014 | Kaminski ................ H02K 3/22 310/59 |
| 2015/0076969 | A1 * | 3/2015 | Lasorso .................... H02K 1/20 310/60 A |

(Continued)

FOREIGN PATENT DOCUMENTS

| EP | 2680404 | * | 1/2014 |
| EP | 2680404 | A1 | 1/2014 |
| GB | 2403605 | A | 1/2006 |

*Primary Examiner* — Ahmed Elnakib
(74) *Attorney, Agent, or Firm* — Dority & Manning, P.A.

(57) ABSTRACT

A stator core is provided that can define a plurality of core slots in a surface thereof. The core slots can extend between a first and a second end portion of the stator core. A winding can be housed in the core slots. The winding can define a channel through at least a portion thereof. A cooling system can be operably coupled with the channel and can be configured to move a cooling fluid through the channel. A turbulator can be positioned within the channel. The turbulator can be within a flowpath of the cooling fluid and can be integrally formed with the winding.

19 Claims, 11 Drawing Sheets

(56) References Cited

U.S. PATENT DOCUMENTS

| | | | |
|---|---|---|---|
| 2015/0345305 A1* | 12/2015 | Allen | F01D 5/188 |
| | | | 416/95 |
| 2016/0156146 A1 | 6/2016 | Safari-Zadeh | |
| 2016/0211721 A1* | 7/2016 | Garmon | H02K 9/08 |
| 2017/0126084 A1* | 5/2017 | Schweinert | H02K 9/193 |
| 2019/0148037 A1* | 5/2019 | Leach | H02K 3/22 |
| | | | 174/120 R |
| 2019/0165652 A1* | 5/2019 | Jassal | H02K 3/30 |
| 2019/0178585 A1 | 6/2019 | de Bock et al. | |
| 2019/0372410 A1* | 12/2019 | Boxberg | H02K 1/16 |
| 2022/0069655 A1* | 3/2022 | Osama | H02K 3/22 |
| 2023/0187990 A1* | 6/2023 | Osama | H02K 3/24 |
| | | | 310/53 |

* cited by examiner

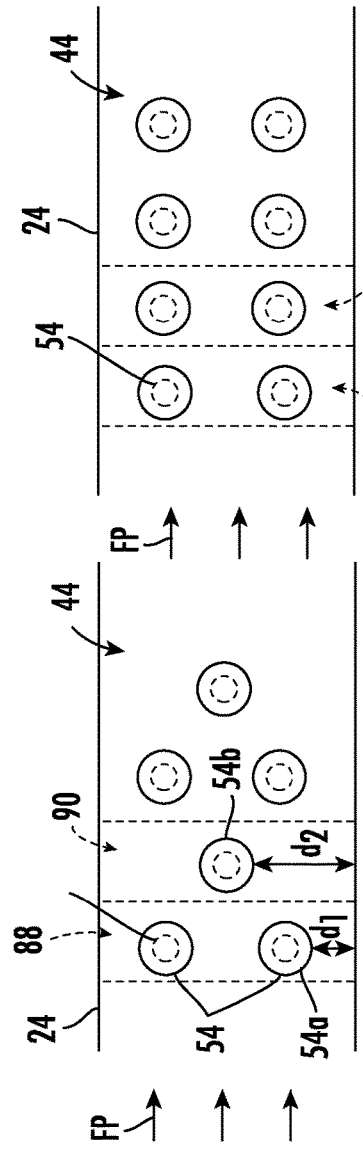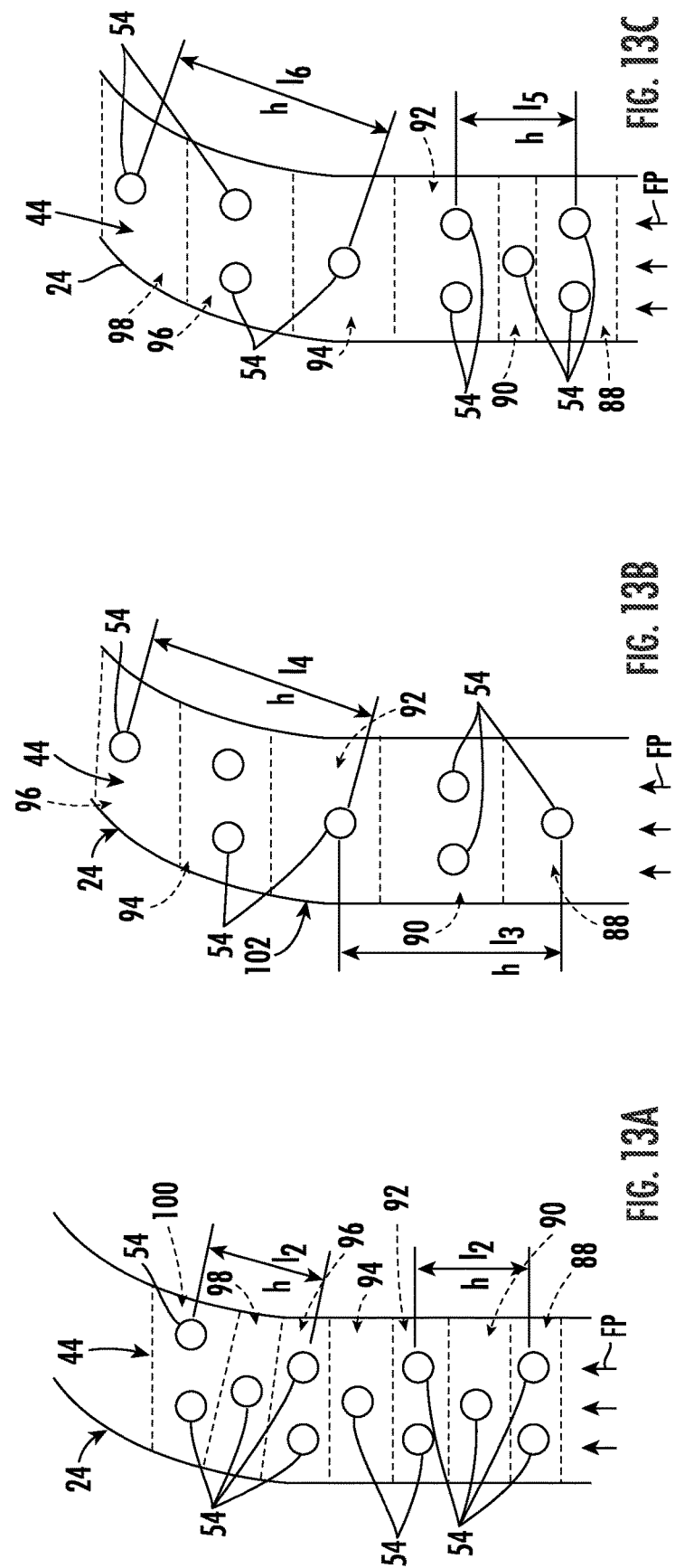

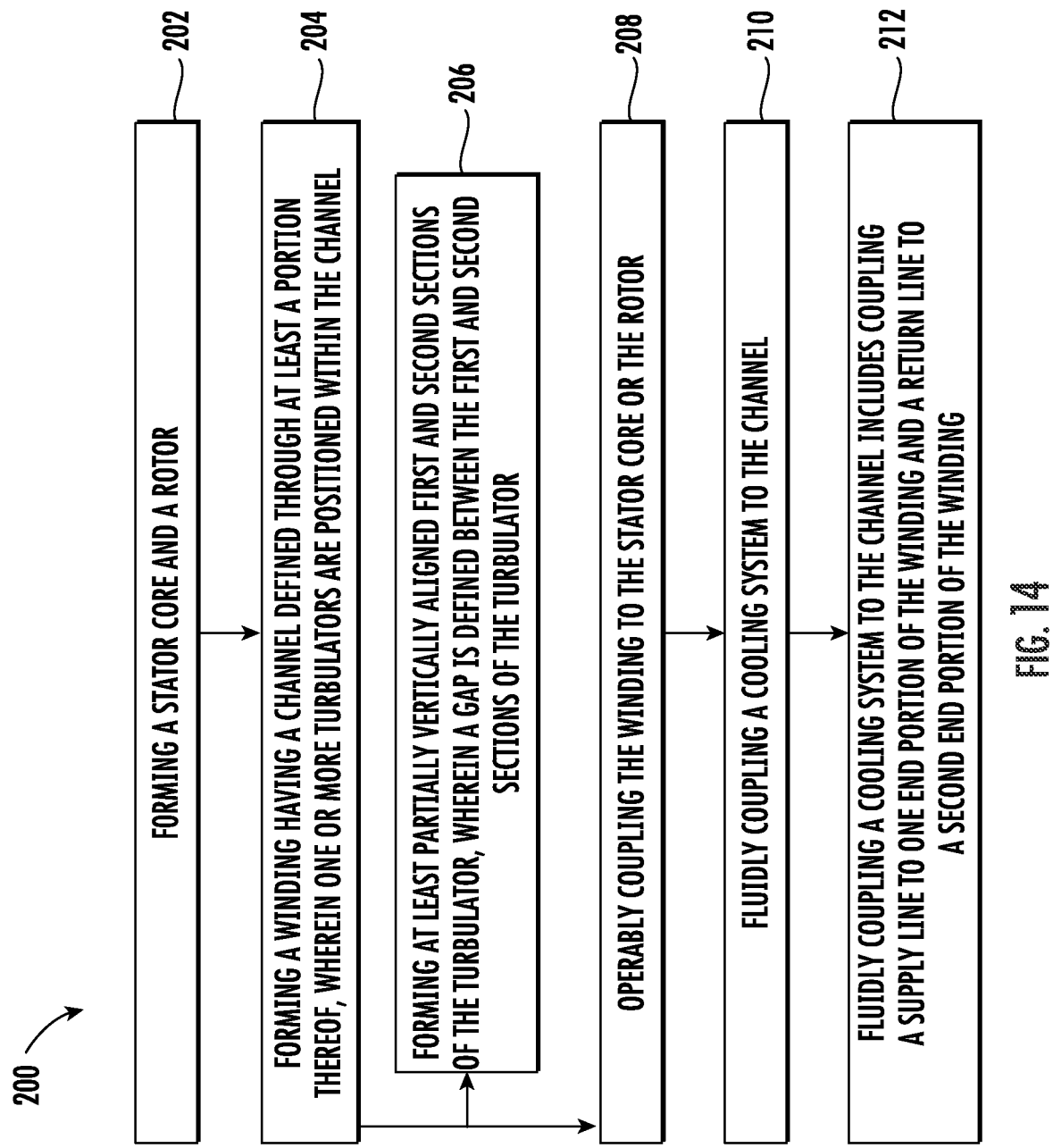

ELECTRIC MACHINE

PRIORITY INFORMATION

The present application claims priority to, and is a continuation of, U.S. patent application Ser. No. 17/007,064, titled "ELECTRIC MACHINE", and filed on Aug. 31, 2020, which is incorporated by reference herein.

FIELD

The present subject matter relates generally to an electric machine having a cooling system fluidly coupled with one or more windings of the electric machine.

BACKGROUND

Electric machines, such as generators, motors, motor/generators, starter/generators, and other electric machines can be used for a variety of purposes. In operation, the electric machine includes a rotor that can be rotated relative to the stator to generate electrical energy and/or can be rotated relative to the stator as a result of changing magnetic fields induced in windings of the stator. During the operation of the electric machines, heat is generated that may negatively affect the efficiency or output of the electric machines. Accordingly, electric machines that are capable of rejecting additional heat would be useful.

BRIEF DESCRIPTION

Aspects and advantages of the invention will be set forth in part in the following description, or may be obvious from the description, or may be learned through practice of the invention.

In some embodiments of the present disclosure, an electric machine includes a stator core defining a plurality of core slots in a surface thereof. A winding is housed in at least one of the plurality of core slots. The winding defines a channel through at least a portion thereof. A cooling system is operably coupled with the channel and is configured to move a cooling fluid through the channel. A turbulator is positioned within the channel. The turbulator is within a flowpath of the cooling fluid.

In some embodiments of the present disclosure, a method includes a method of manufacturing an electric machine having a stator core and a rotor, The method includes forming a winding for the stator core of the electric machine having a channel defined through at least a portion thereof, wherein forming the winding further includes integrally forming one or more turbulators within the channel.

In some embodiments of the present disclosure, a winding for an electric machine includes an elongated body. The elongated body is configured to be operably coupled with at least one of a stator or a rotor. A channel is defined by the elongated body and extending through at least a portion of the elongated body. A turbulator is positioned within the channel. The turbulator is within a cooling fluid flowpath through the channel.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 12A and 12B illustrate various cross-sectional views of the winding of FIG. 8 taken along the line XII-XII in accordance with various aspects of the present disclosure illustrating a plurality of turbulators within the winding;

FIGS. 13A-13C illustrate various cross-sectional views of the winding of FIG. 8 taken along the line XIII-XIII in accordance with various aspects of the present disclosure illustrating a plurality of turbulators within the winding; and FIG. 14 is a flow diagram of a method for operating the electric machine in accordance with various aspects of the present disclosure.

DETAILED DESCRIPTION

Figure 1:
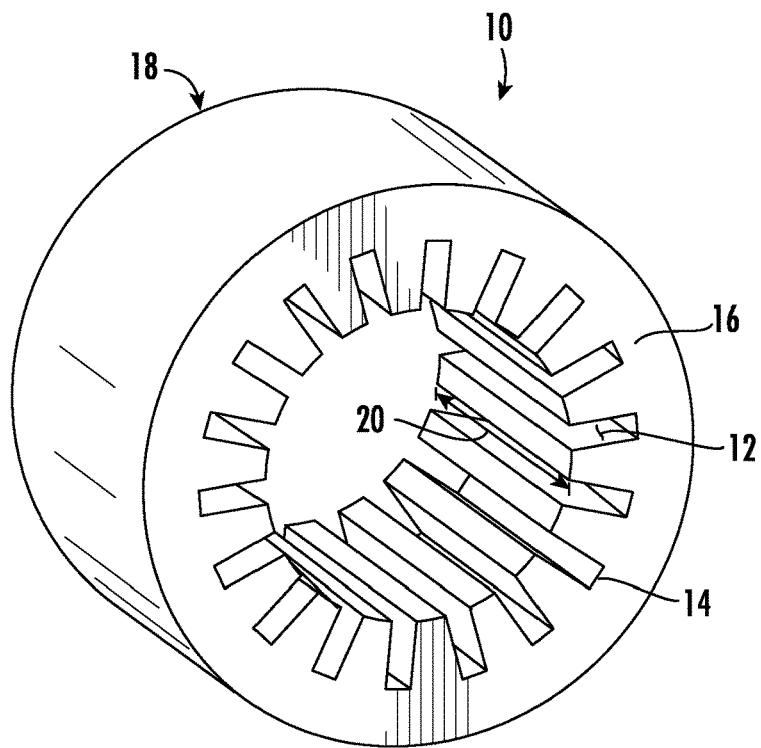
FIG. 1 is a perspective view of a stator core in accordance with various aspects of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify the location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to cooling fluid flowpath in a fluid pathway. For example, "upstream" refers to the direction from which the cooling fluid flowpaths, and "downstream" refers to the direction to which the cooling fluid flowpaths.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination Generally, the present disclosure provides for an electrically conductive winding that may be operably coupled with a stator and/or a rotor of an electric machine, or any other device incorporating electrically conductive material. During operation, the rotor can be mechanically powered, driven, or rotated by a force, such as the mechanical energy of an engine, about an axis of rotation. The relative rotational motion of the rotatable rotor relative to the fixed or stationary stator generates electrical power in the one or more windings due to the interaction of the electric machine magnetic fields. The electrical power generated in the one or more windings can be conductively connected to, and further delivered to, at least one electrical load or power source. In some aspects, the electric machine can provide the electrical power to a power distribution system or power distributed network. By contrast, when operated as an electric motor, alternating current electric power (such as three-phase alternating current electric power) may be provided to the one or more windings of the stator which produces rotational movement of the rotor.

The electrically conductive winding may define a channel therein and one or more turbulators may be positioned within the channel. The one or more turbulators may be configured as any type of structure that extends from an interior surface of the channel. In various examples, the turbulators may have common or varying widths, shapes, heights, and/or offsets relative to one another. The turbulators can include pins, dimples, and various other protrusion shapes that improve the heat transfer by increasing the turbulence. Their location, dimensions, and frequency are chosen to minimize the increase of loss coefficient due to their existence.

A cooling system can be operably coupled with the channel and configured to move a cooling fluid through the channel. While the cooling fluid moves through the channel, heat is accepted from the windings into the cooling fluid that is then at least partially removed from the cooling fluid externally from the winding. In addition, the cooling fluid may contact one or more turbulators within the channel, which can create a less laminar flow within the channel to increase thermal transfer of heat into the cooling fluid and/or increase a surface area of the winding to increase an amount of heat that may be transferred to the cooling fluid. The heated cooling fluid may be cooled through a heat exchanger that can be external from the windings.

The turbulators are configured to improve the thermal performance of electric machines that employ a cooling system. By implementing turbulators inside the winding channels to enhance the heat transfer coefficient (HTC) of the thermal system and therefore improve heat extraction from the electrical machine. By operating in accordance with one or more of the disclosed aspects, the electric machine provided herein may provide for a more efficient electric machine due to the lowered operating temperature. The electric machine may, additionally or alternatively, be capable of producing more electric power when operated as a generator and/or more efficiently use electric power when operated as a motor.

Figure 2:
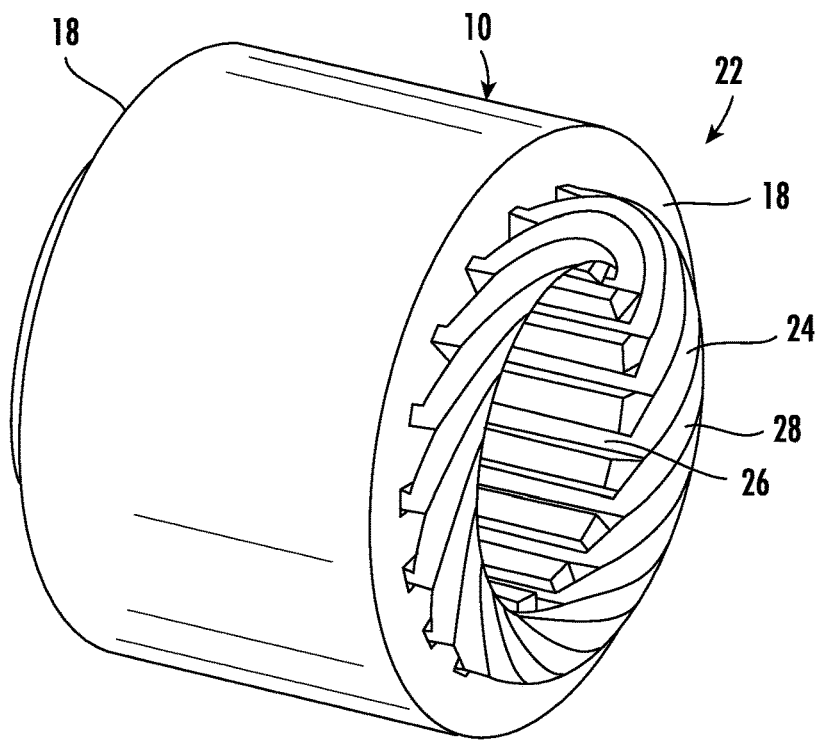
FIG. 2 is a perspective view of the stator core of FIG. 1 having a plurality of windings in accordance with various aspects of the present disclosure.
Figure 3:
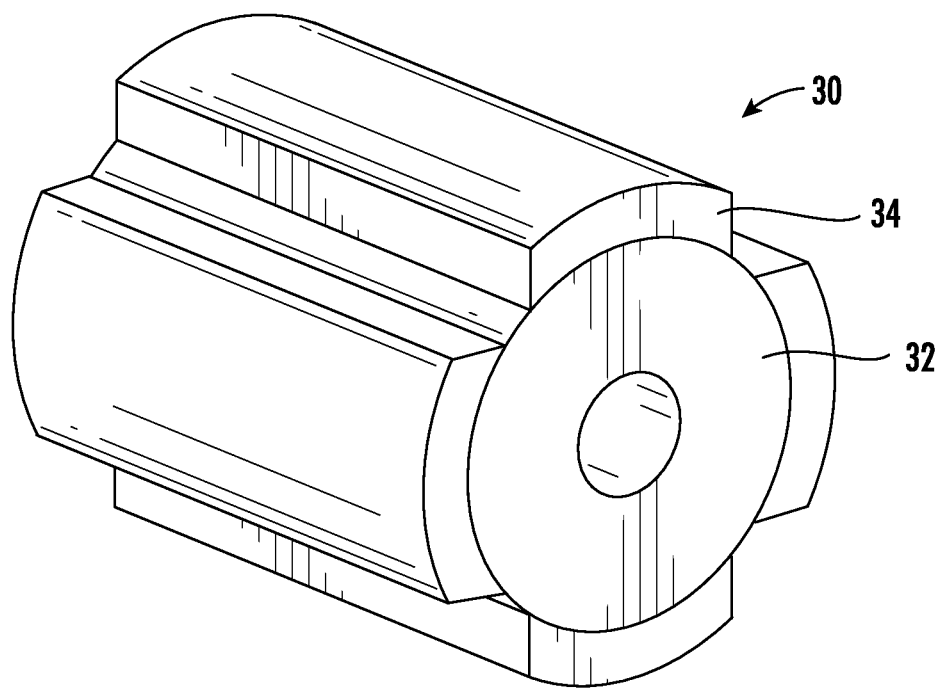
FIG. 3 is a perspective view of a permanent magnet rotor that may be operably coupled with a stator core in accordance with various aspects of the present disclosure.

Referring now to the drawings, wherein identical numerals indicate the same elements throughout the figures, FIGS. 1 and 2 provide a generally cylindrically-shaped stator core 10 that can define a plurality of core slots 12 formed in a circumferential inner diameter 14 of the stator core 10. The core slots 12 can extend between a first end portion 16 and a second end portion 18 of the stator core 10.

In various embodiments, the core slots 12 are generally equally spaced around the circumferential inner diameter 14 of the stator core 10, unequally spaced around the circumferential inner diameter 14 of the stator core 10, and/or a combination thereof. The core slots 12 define a radial depth 20, between the end portions 16, 18 of the core slots 12. The core slots 12 are adapted to receive one or more windings 24. In some embodiments, each winding 24 can have a plurality of segments that can include one or more slot segments 26 housed in the core slots 12 and one or more plurality of end loop segments 28. The core slots 12 may have a rectangular cross-sectional shape as can be seen in FIG. 1 and/or any other shape without departing from the teachings provided herein.

Referring to FIGS. 3-6, a rotor 30 can include a rotor core 32 and one or more windings 24 and/or magnets 34 supported by the rotor core 32. The rotor 30 can also support and/or be operably coupled with a rotatable shaft 40. In various embodiments, the rotor 30 can be, but is not limited to, a "claw pole" rotor, a permanent magnet non-claw pole rotor, a permanent magnet claw pole rotor, salient field wound rotor, or an induction type rotor.

With further reference to FIGS. 3-6, in some embodiments, an electric machine 38 is formed when the stator 22 is operably coupled with the rotor 30. During operation, the rotor 30 can be mechanically powered, driven, or rotated by a force, such as the mechanical energy of an engine, about an axis of rotation. The relative rotational motion of the rotatable rotor 30 relative to the fixed or stationary stator 22 generates electrical power in the one or more windings 24 due to the interaction of the electric machine magnetic fields. The electrical power generated in the one or more windings 24 can be conductively connected to, and further delivered to, at least one electrical load or power source. In some aspects, the electric machine 38 can provide the electrical power to a power distribution system or power distributed network. By contrast, when operated as an electric motor, alternating current electric power (such as three-phase alternating current electric power) may be provided to the one or more windings 24 of the stator 22 which produces rotational movement of the rotor 30. In addition, the type of electric machine 38 provided herein may be alternating current (AC) synchronous, AC induction, switched reluctance, or any other practicable type of electric machine.

Figure 7:
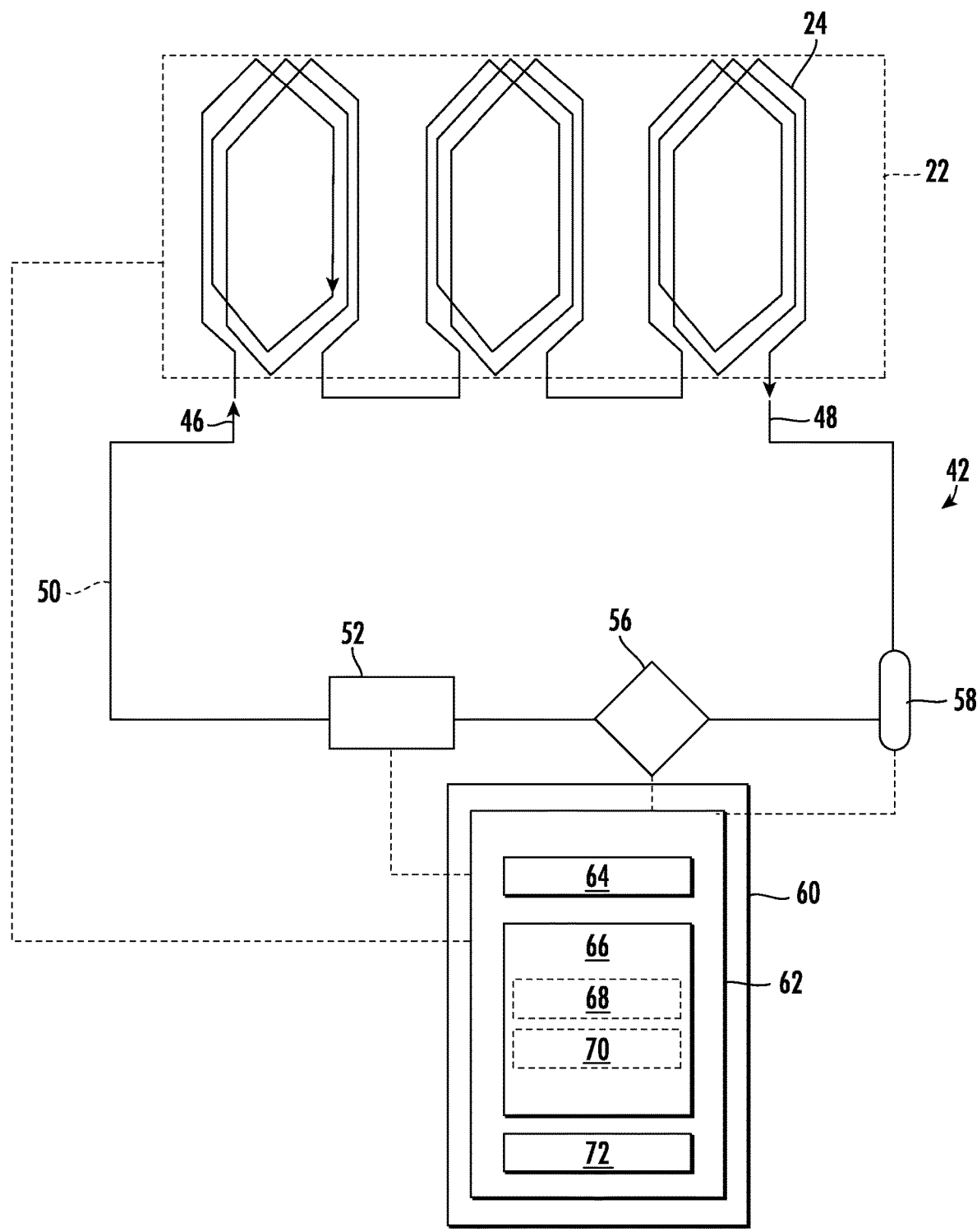
FIG. 7 is a schematic diagram of a cooling system operably coupled with one or more windings of the electric machine in accordance with various aspects of the present disclosure.
Figure 8A:
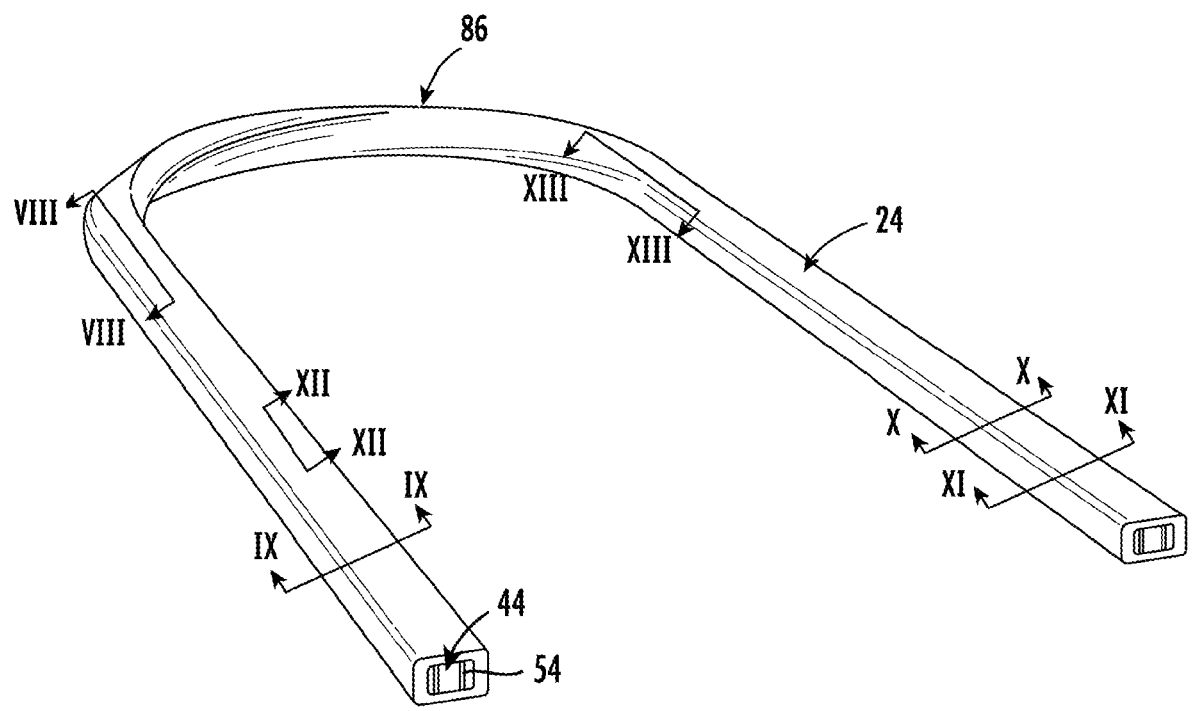
FIG. 8A is a perspective view of a portion of one of the windings defining a channel in accordance with various aspects of the present disclosure.
Figure 8B:
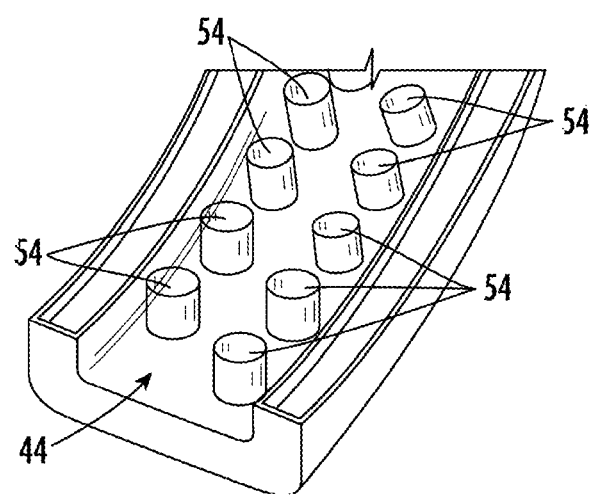
FIG. 8B is a cross-sectional view of a portion of the winding of FIG. 8A taken along the line VIIIB-VIIIB.

Referring to FIGS. 7-8B, to maintain a temperature of the electric machine 38 within a desired operating temperature range while in operation, the electric machine 38 can include a cooling system 42. In some embodiments, one or more of the windings 24 of the electric machine 38 may include an elongated body 86 that defines a cooling channel 44 extending therethrough that is in fluid communication with the cooling system 42. In some embodiments, each winding 24 may be independently coupled with the cooling system 42, and/or a first winding 24 may be fluidly coupled to a second winding 24 and coupled to the cooling system 42 in series.

In some embodiments, the cooling system 42 may provide the windings 24 of the stator 22 and/or the rotor 30 with a cooling fluid in the form of a lubrication oil, a consumable liquid (such as water), a gas, a supercritical vapor, and/or any other suitable cooling fluid. In various embodiments, the cooling fluid may have a high specific heat capacity to transport heat from the winding 24 to a heat exchanger 56 via the cooling fluid flowpath FP, a low dynamic viscosity to reduce the amount of power needed for moving the cooling fluid through the cooling system 42 and the channel 44, a high flash/boiling temperature to allow for a high operating temperature, and/or a high dielectric strength to withstand potential temperature differences across the winding 24 that could generate corona discharge, which could pit or corrode the winding 24. In various embodiments, the cooling fluid may be electrically insulative to avoid electric short circuit through the cooling fluid leading to axial circulating currents (due to potential difference across winding 24 axially) which increase the losses, and/or may have a high corrosion resistance to avoid corroding over time the parts of the electric machine 38 contacted by the cooling fluid.

In various embodiments, such as the example illustrated in FIG. 7, the cooling system 42 can include a cooling system supply line 46 and a return line 48 in communication with the one or more of the windings 24. The cooling system supply line 46 and return line 48 transport a cooling fluid 50 to and from the channel 44 of each winding 24. It will be understood that the cooling system supply line 46 and return line 48 may be formed in a variety of configurations suitable for this purpose.

A pump assembly 52 (and/or compressor assembly) is positioned between the cooling system supply line 46 and the return line 48 opposite the one or more windings 24. The pump assembly 52 can be responsible for the movement of the cooling fluid 50 through the channels 44. In some embodiments, the pump assembly 52 may be configured to maintain the flow rate of the cooling fluid 50 below a maximum desired flow rate, which may reduce and/or prevent erosion of one or more turbulators 54, or any other feature, that may be within the channel 44.

In some instances, the cooling system 42 may include a heat exchanger 56 in communication with both the cooling system supply line 46 and the return line 48. In some instances, the heat exchanger 56 can be positioned between the windings 24 and the pump assembly 52. In some examples, the heat exchanger 56 can be configured to transfer thermal energy from the cooling fluid 50 to the atmosphere, which can reduce the temperature of the cooling fluid 50. Although a heat exchanger 56 has been referenced herein, it should be understood that the present disclosure contemplates the use of any present or future methodologies for transfer of thermal energy that will function as described and claimed.

In some examples, the cooling fluid 50 flow may be considered closed-loop. However, losses of the cooling fluid 50 are contemplated during normal operation. To this end, the cooling system 42 may further include a reservoir 58 in communication with the return line 48 in order to replace any losses of the cooling fluid 50.

Moreover, in some embodiments, the cooling system 42, the stator 22, and/or the electric machine 38 can further include (or be operably coupled with) a computing system 60 that causes the electric machine 38 to perform certain functions, such as actuation of the pump assembly 52. One or more functions may be controlling any of the components of the cooling system 42 and/or of the electric machine 38. The computing system 60 can include one or more computing device(s) 62. The computing device(s) 62 can include one or more processor(s) 64 and one or more memory device(s) 66. The one or more processor(s) 64 can include any suitable processing device, such as a microprocessor, microcontroller, integrated circuit, logic device, and/or other suitable processing device. The one or more memory device (s) 66 can include one or more computer-readable media, including, but not limited to, non-transitory computer-readable media, RAM, ROM, hard drives, flash drives, and/or other memory devices.

The one or more memory device(s) 66 can store information accessible by the one or more processor(s) 64, including computer-readable instructions 68 that can be executed by the one or more processor(s) 64. The instructions 68 can be any set of instructions that when executed by the one or more processor(s) 64, cause the one or more processor(s) 64 to perform operations. In some embodiments, the instructions 68 can be executed by the one or more processor(s) 64 to cause the one or more processor(s) 64 to perform operations, such as any of the operations and functions for which the computing system 60 and/or the computing device(s) 62 are configured, the operations for operating the cooling system 42 and/or the electric machine 38, and/or any other operations or functions of the one or more computing device(s) 62. The instructions 68 can be software written in any suitable programming language or can be implemented in hardware. Additionally, and/or alternatively, the instructions 68 can be executed in logically and/or virtually separate threads on the processor(s) 64. The memory device(s) 66 can further store data 70 that can be accessed by the processor(s) 64. For example, the data 70 can include data indicative of electric machine temperature, winding temperature, cooling fluid temperature, cooling fluid flow rate, efficiency gain based on use of the cooling system 42, and/or any other information.

The computing device(s) 62 can also include a network interface 72 used to communicate, for example, with the other components of system 500 (e.g., via a network). The network interface 72 can include any suitable components for interfacing with one or more network(s), including, for example, transmitters, receivers, ports, controllers, antennas, and/or other suitable components. One or more external display devices (not depicted) can be configured to receive one or more commands, data, and/or information from the computing device(s) 62.

Referring to FIGS. 9A-9D, in various embodiments, one or more turbulators 54 positioned within the channel may affect the flow of the fluid through the channel 44 through altering a pressure, altering a flow rate, changing a flow from a laminar flow to a turbulent flow (or vice versa), increasing the surface area of the channel 44 along the winding 24 thereby increasing heat rejection properties of the winding 24, etc. Generally, the more turbulent the flow, all other things being equal, the greater the rate of heat transfer. Stated another way, the higher the Reynolds number, the more rapid the rate of heat transfer. In addition, a laminar flow of fluid within the channel 44 may make uniform heat transfer and/or desired rates of heat transfer more difficult. Further, the turbulators 54 may have a varied concentration along the channel 44 of the winding 24 based on local heat production of various portions of the windings 24 which can enhance heat removal from the winding 24 through the cooling system 42 and/or maintain a more uniform temperature along the winding 24.

The one or more channels 44 and/or the turbulators 54 within the one or more channels 44 may be formed through an additive manufacturing process. In some embodiments, the turbulators 54 may be simultaneously formed with various portions of the winding 24 during the additive manufacturing process. In some examples, Electron Beam Melting (EBM) may be used to form the winding 24 from a material having a high conductivity. For instance, the winding 24 may be formed from a material at least partially containing copper (e.g., 99.95% pure copper). In other examples, the winding 24 may be formed from any other conductive material, such as copper alloys, silver, aluminum, aluminum alloys, and/or carbon-nano-tubes (CNT). Moreover, it will be appreciated that the turbulators 54 may be formed in any manner without departing from the scope of the present disclosure.

With further reference to FIGS. 9A-9D, the turbulators 54 can include pins, dimples, and various other protrusion shapes that improve the heat transfer by increasing the turbulence. The location, dimensions, and frequency of the turbulators 54 are chosen to minimize the increase of a power loss coefficient due to their existence creating a higher pressure loss for moving the cooling fluid 50 through the channel 44.

Figure 9A:
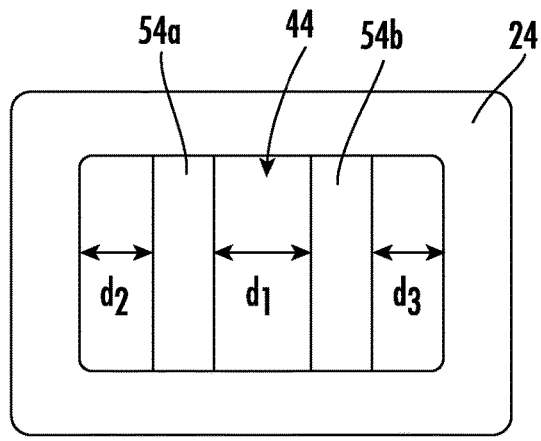
FIGS. 9A-9D illustrate various cross-sectional views of the winding of FIG. 8A taken along the line IX-IX in accordance with various aspects of the present disclosure illustrating a pair of turbulators separated by various distances.

As illustrated in FIGS. 9A-9D, each of the turbulators 54 may be aligned along the channel 44 or varied in distance from a side portion of the channel 44 and/or an adjacent turbulator 54. For example, as illustrated in FIG. 9A, first and second turbulators 54 may be positioned a first distance $d_1$ from one another. In some embodiments, the first distance $d_1$ may be generally equal to a second distance $d_2$ defined between the first turbulator 54a and a side portion of the channel 44 and/or a third distance $d_3$ that is defined between the second turbulator 54b and an opposing side portion of the channel 44.

Figure 9B:
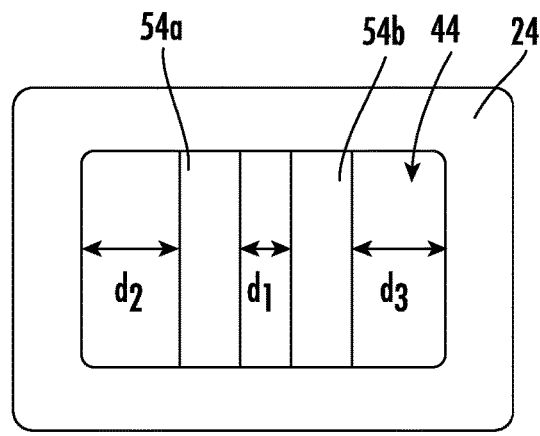
Figure 9C:
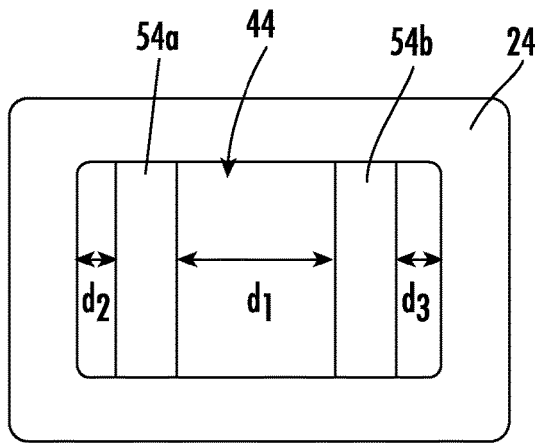

In some embodiments, such as the example illustrated in FIG. 9B, the first and second turbulators 54a, 54b may be separated by the first distance $d_1$, which may be generally less than the second and third distances $d_2$, $d_3$ that are respectively defined between the first turbulator 54a and the side portion of the channel 44 and the second turbulator 54b and the side portion of the channel 44. Additionally, or alternatively, as illustrated in FIG. 9C, the first distance $d_1$ may be generally greater than the second and third distances $d_2$, $d_3$ that are respectively defined between the first turbulator 54a and the side portion of the channel 44 and the second turbulator 54b and the side portion of the channel 44.

Figure 9D:
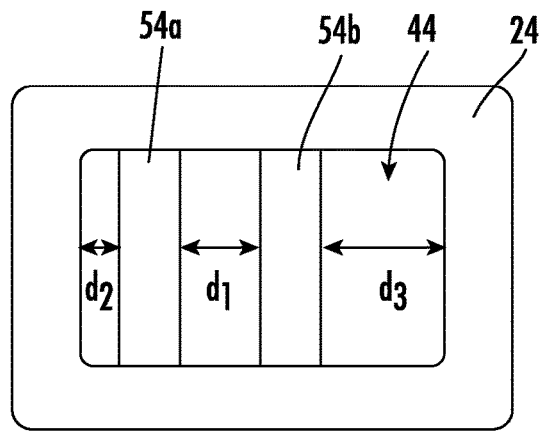
Figure 10A:
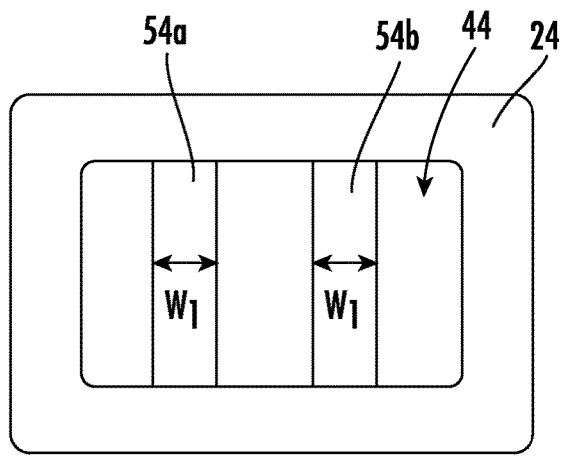
FIGS. 10A-10D illustrate various cross-sectional views of the winding of FIG. 8A taken along the line X-X in accordance with various aspects of the present disclosure illustrating a pair of turbulators of various widths.
Figure 10B:
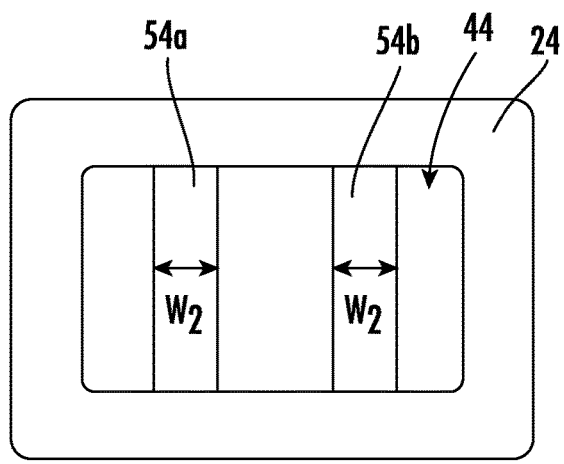
Figure 10C:
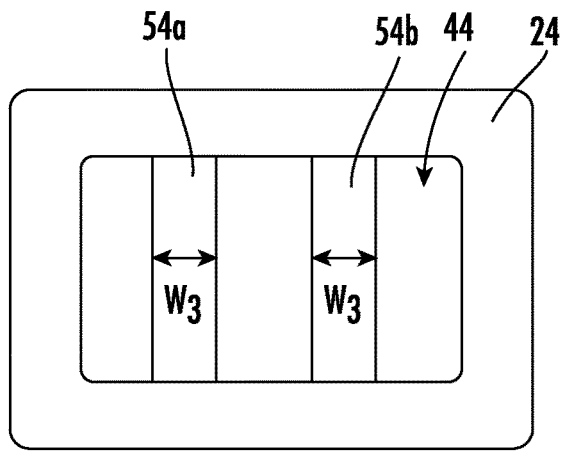
Figure 10D:
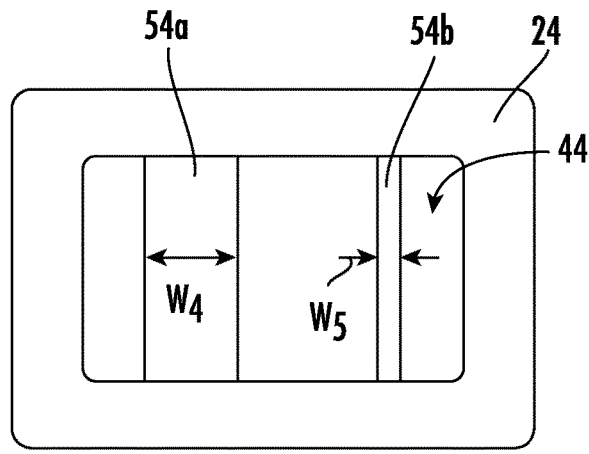

In some embodiments, such as the example illustrated in FIG. 9D, the second distance $d_2$ defined between the first turbulator 54a and the side portion of the channel 44 may be less than the third distance $d_3$ defined between the first turbulator 54a and the side portion of the channel 44. As provided herein, the channel 44 can include any number of turbulators 54 along the winding 24. Each of the turbulators 54 may be positioned such that some turbulators 54 are similar to the arrangements illustrated in FIGS. 9A-9D while other turbulators 54 may be oriented in any other practicable orientation without departing from the scope of the present disclosure.

Referring to FIGS. 10A-10D, the turbulators 54 may be of any practicable width and the widths and shapes of various turbulators 54 may be generally common (e.g. similar in geometry) or varied along the length of the channel 44. For instance, the first and second turbulators 54a, 54b may have a first width $w_1$, which, in embodiments such as the one illustrated in FIG. 10A may be between 0.02 millimeters (mm) and 0.6 mm, a second width $w_2$, which, in embodiments such as the one illustrated in FIG. 10B may be between 0.3 mm and 0.8 mm, and/or a third width $w_3$, which, in embodiments such as the one illustrated in FIG. 10C may be between 0.6 and 2 mm (or any other practicable width). In some embodiments, the first turbulator 54a may be a fourth width $w_4$ that is different than a fifth width $w_5$ of a second turbulator 54b. In some instances, the fourth width $w_4$ may be greater than the fifth width $w_5$. However, in various embodiments, the fourth width $w_4$ may be less than the fifth width $w_5$. In addition, the width of each turbulator 54 may be generally consistent and/or varied along the respective turbulator 54.

Referring to FIGS. 11A-11F, in various embodiments, the turbulators 54 may extend from an upper portion 76 of the channel 44 and/or the lower portion 78 of the channel 44. In some embodiments such as the one illustrated in FIG. 11A, one or more turbulators 54 along the winding 24 provided in FIG. 11A, the turbulators 54 may continuously extend between the upper portion 76 of the channel 44 and the lower portion 78 of the channel 44.

Notably, as used herein, the terms "upper" and "lower," as used to describe aspects of the channel 44, simply refer to opposing sides in a direction perpendicular to a flow direction. Unless stated otherwise, the terms upper and lower do not imply any particular positioning or orientation relative to a vertical direction.

In some embodiments such as those illustrated in FIGS. 11B to 11E, one or more turbulators 54 along the winding 24 may generally extend from one of the upper portion 76 of the lower portion 78 of the channel 44. In such embodiments, a first section 80 of the turbulator 54 may extend from the upper portion 76 of the channel 44 while a second section 82 of the turbulator 54 may extend from the bottom portion of the channel 44. In various embodiments, the first and second sections 80, 82 may be generally vertically aligned, and/or the first and second sections 80, 82 may be generally vertically offset from one another. As used herein, generally vertically offset means that an extension axis A1 of the first section 80 is vertically misaligned and/or non-parallel with an extension axis A2 of the second section 82.

With further reference to FIGS. 11B to 11E, a gap 84 may be defined between the first and second sections 80, 82 of the turbulators 54 in examples in which a turbulator 54 extends less than the full distance of the channel 44. In various embodiments, the gap 84 is of a distance that is greater than a length of the first or second section 80, 82. In addition, the gap 84 between various turbulators 54 of the channel 44 may be generally consistent or varied from one turbulator 54 to the next.

Figure 11A:
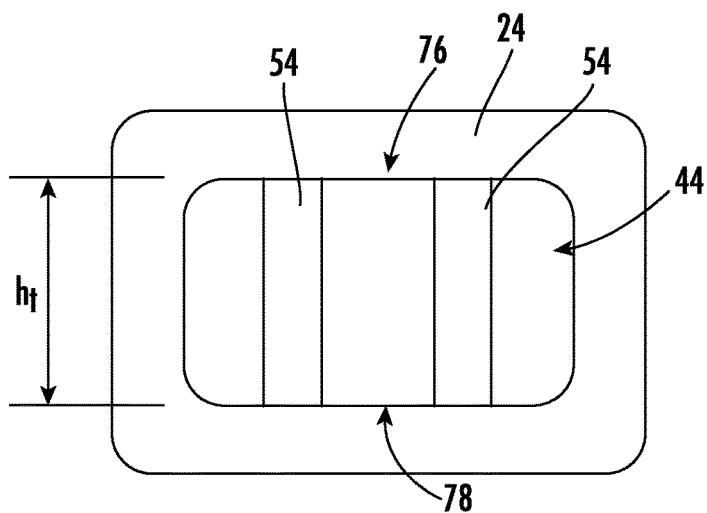
FIGS. 11A-11F illustrate various cross-sectional views of the winding of FIG. 8A taken along the line XI-XI in accordance with various aspects of the present disclosure illustrating turbulators of various heights.
Figure 11B:
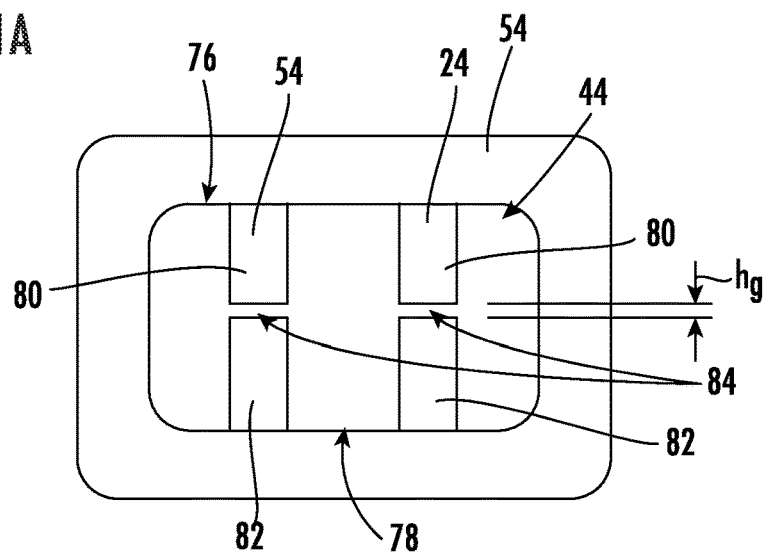
Figure 11C:
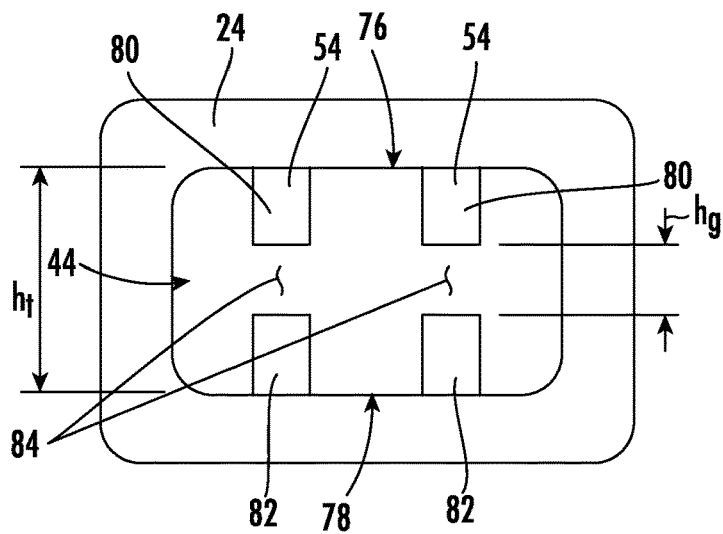
Figure 11D:
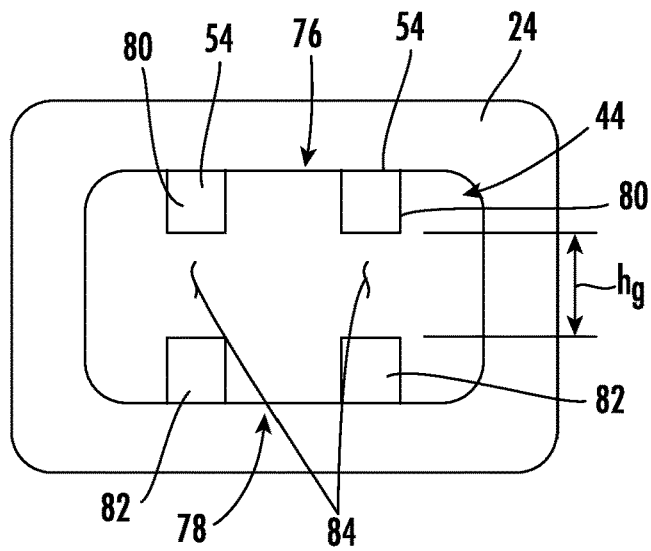
Figure 11E:
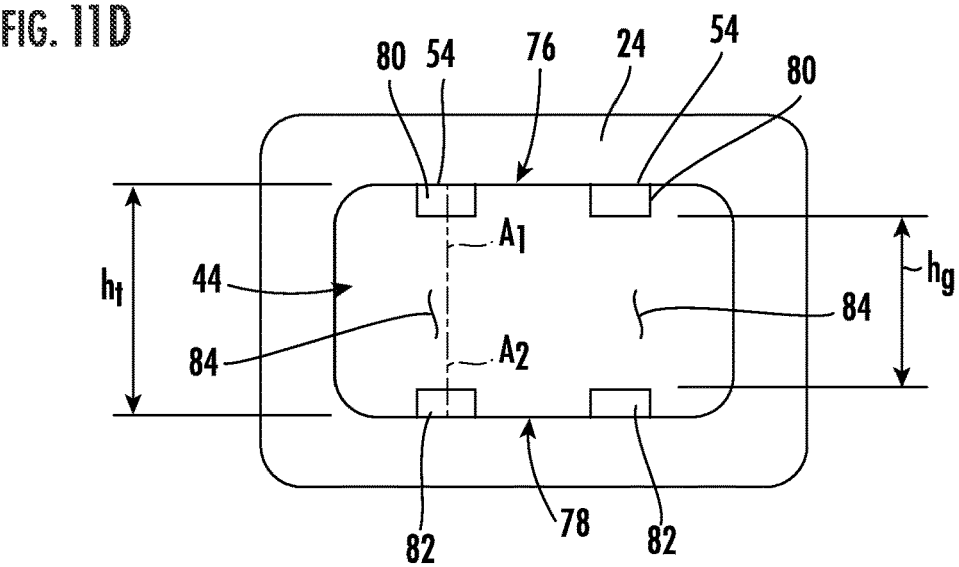

In some instances, the height $h_g$ of the gap 84 may be less than 15% of the total height $h_t$ between the upper and lower portions 76, 78 of the channel 44, such as about 10% (FIG. 11B), between 15% and 50% of the total height $h_t$ between the upper and lower portions 76, 78 of the channel 44, such as about 25% (FIG. 11C), between 40% and 70% of the total height $h_t$ between the upper and lower portions 76, 78 of the channel 44, such as about 50% (FIG. 11D), and between 50% and 99.9% of the total height $h_t$ between the upper and lower portions 76, 78 of the channel 44, such as about 75% (FIG. 11E). In various embodiments, the turbulators 54 may extend between the side portions of the channel 44 and include the first and/or second sections 80, 82 provided herein. In addition, the turbulators 54 may extend from the top portion, the bottom portion, and/or the side portions in any combination along the winding 24.

Figure 11F:
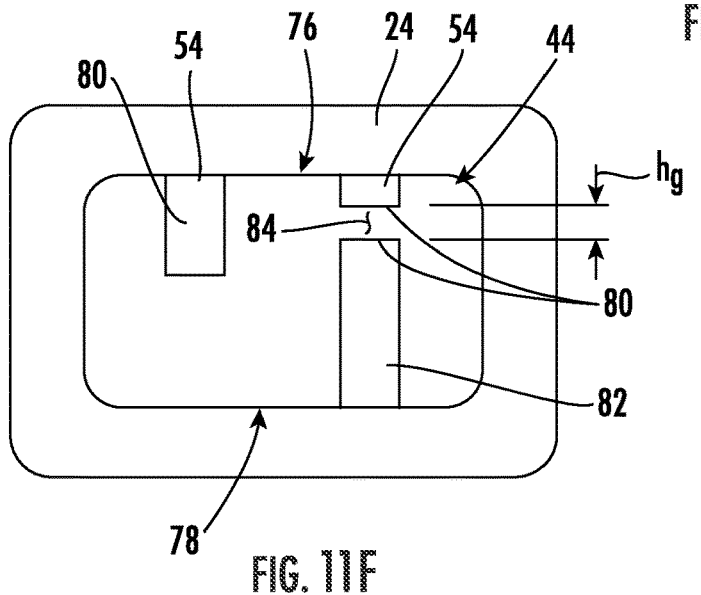

In some embodiments, the turbulators 54 may include just the first section 80 and/or just the second section 82, as illustrated in FIG. 11F. In such instances, the turbulator 54 may extend from the top portion, the bottom portion, and/or a side portion of the channel 44. Moreover, as generally illustrated in FIG. 11F, the first section 80 of the turbulator 54 may be longer (or shorter) than the second section 82 of the same turbulator 54. Accordingly, the gap 84 defined between the first and second sections 80, 82 is asymmetrical relative to a centerline of the channel 44.

With reference to FIGS. 12A and 12B, in various portions of the channel 44, the turbulators 54 may be positioned in a staggered orientation, as illustrated in FIG. 12A, and/or in an aligned orientation, as illustrated in FIG. 12B. Furthermore, the turbulators 54 can be either solid or hollow (as generally illustrated by the phantom circles within each turbulator 54 of FIGS. 12A and 12B) to minimize the additional winding 24 mass.

Each turbulator 54 is positioned within a cooling fluid flowpath FP of the channel 44 and configured to alter a flow of a cooling fluid 50. In instances in which the turbulators 54 are positioned in the staggered orientation, as illustrated in FIG. 12A, a laterally outward turbulator 54 of a first row of turbulators 54 can be positioned a first distance from a side portion of the channel 44 and a laterally outward turbulator 54 of a second row 90 of turbulators 54 that is downstream of the first row 88 of turbulators 54 can be positioned a second larger distance from the side portion of the channel 44. By incorporating a staggered orientation, a wake effect of the cooling fluid 50 may be reduced and/or prevented within the channel 44. In addition, a staggered orientation may increase heat transfer while minimizing or maintaining a lower pressure increase within the channel 44. It will be appreciated that each row 88, 90 may include any number (one or more) turbulators 54 and each consecutive row (e.g., 90) may be positioned downstream of the previous row (e.g., 88). In some instances, some of the turbulators 54 may be staggered while others may be aligned within departing from the scope of the present disclosure.

With reference to FIG. 12B, in some embodiments, one or more turbulators 54 in a first row 88 may be in generally aligned orientation with one or more turbulators 54 in a subsequent second row 90. In various embodiments, the alignment may be generally along a cooling fluid flowpath FP of the channel 44.

Referring to FIGS. 13A-13C, in non-linear portions of the winding 24, the one or more rows 88, 90, 92, 94, 96, 98, 100 of turbulators 54 may be positioned in common or varied orientations. For instance, as illustrated in FIG. 13A, the turbulators 54 are aligned in seven rows 88, 90, 92, 94, 96, 98, 100 with one or more turbulators 54 in each row 88, 90, 92, 94, 96, 98, 100. In the illustrated embodiment, a first pair of rows 88, 92 may be located on a linear portion of the winding 24 and include at least one turbulator 54 in each row 88, 92. The one or more turbulators 54 may be oriented a common distance from a side portion of the channel 44 and be separated by a first length $l_1$ generally along the cooling fluid flowpath FP. A second pair of rows 96, 100 may be arranged on a curved portion of the winding 24 and include at least one turbulator 54 in each row 96, 100. The one or more turbulators 54 of the second pair of rows 96, 100 may be oriented at a common distance from a side portion of the channel 44 and be separated by a second length 12 generally along the cooling fluid flowpath FP. As used herein, a "common" distance may be any distance within a 10% range of a distance between two components. In various embodiments, the first and second lengths $l_1$, $l_2$ may be generally equal.

Referring to FIG. 13B, in some embodiments, a row (e.g., 92) of turbulators 54 may be positioned on a transition portion 102 between the linear portion and the curved portion of the channel 44. A row 88 of turbulators 54 may be positioned upstream and separated from the row 92 of turbulators 54 on the transition portion 102 by a third length $l_3$. Likewise, a row 96 of turbulators 54 may be positioned downstream and separated from the row 92 of turbulators 54 on the transition portion 102 by a fourth length $l_3$. The third and fourth lengths $l_3$, $l_4$ may be equal and/or varied along various portions of the winding 24 and/or in various embodiments. Moreover, each of the third and fourth lengths 13, 14 may be greater than the first and second lengths $l_1$, $l_2$.

With reference to FIG. 13C, in some instances a first pair of rows 88, 92 may be positioned in a first portion, such as the linear portion of the winding 24, and separated by a fifth length 15. A second pair of rows 94, 98 may be positioned in a second portion, which may be at least partially within the curved portion of the winding 24, and separated by a sixth length $l_6$. The fifth and sixth lengths $l_5$, $l_6$ may be equal and/or varied along various portions of the winding 24 and/or in various embodiments.

Referring now to FIG. 14, a flow diagram is provided of a method 200 for manufacturing an electric machine 38 in accordance with various aspects of the present disclosure. The electric machine 38 manufactured by the disclosed method may be configured in accordance with one or more of the embodiments described hereinabove and depicted in FIGS. 1 through 13C. As such, in at least certain aspects, the electric machine 38 operated by the method 200 may be incorporated into an engine, such as an aeronautical gas turbine engine, and may include a stator 22 and a rotor 30.

Figure 4:
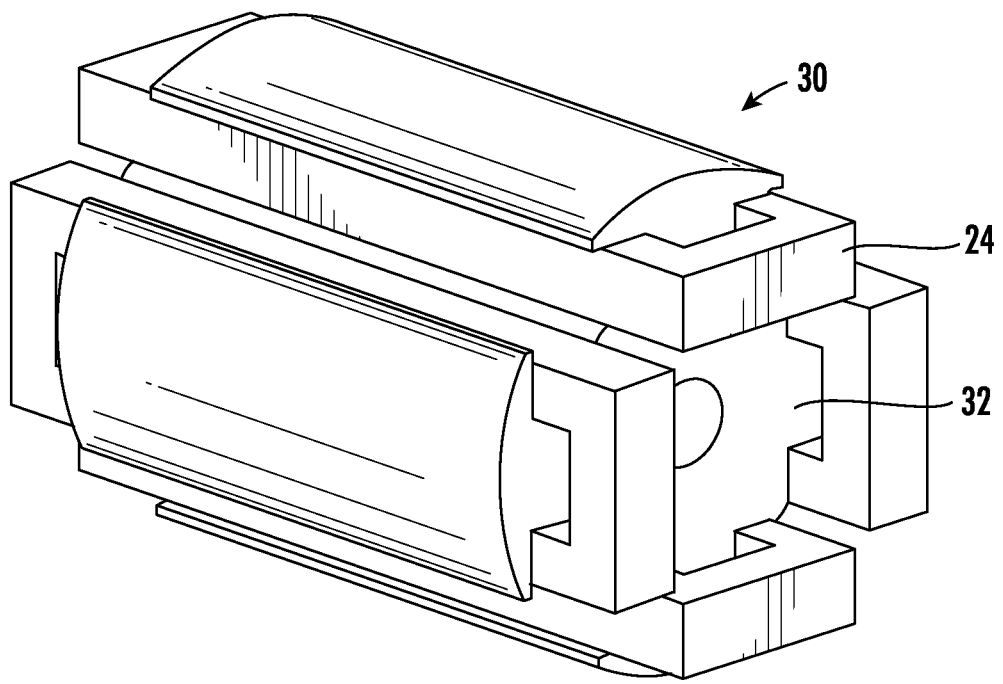
FIG. 4 is a perspective view of a rotor having one or more windings that may be operably coupled with a stator core in accordance with various aspects of the present disclosure.
Figure 5:
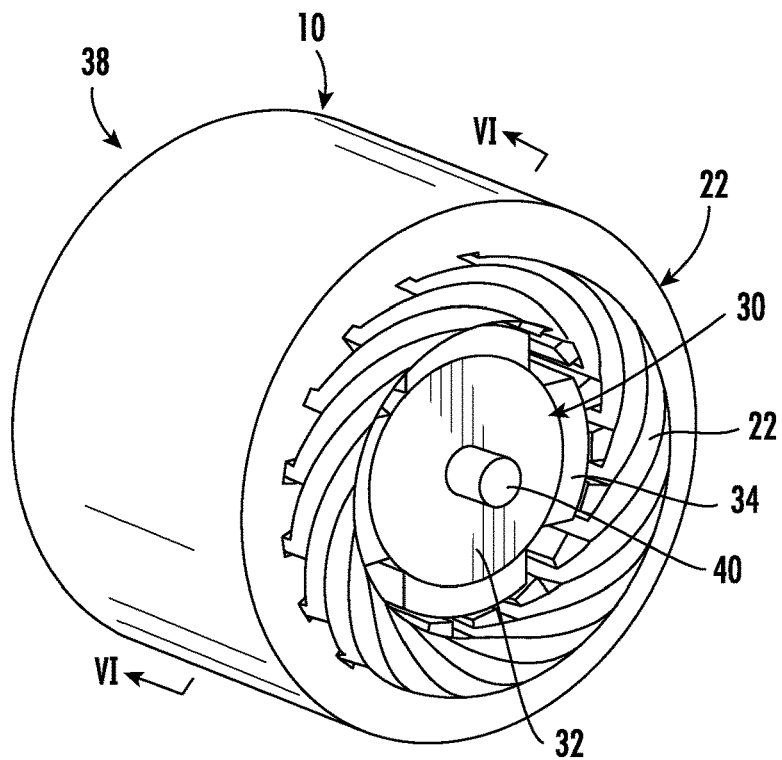
FIG. 5 is a perspective view of an electric machine having the rotor positioned within the stator core in accordance with various aspects of the present disclosure.
Figure 6:
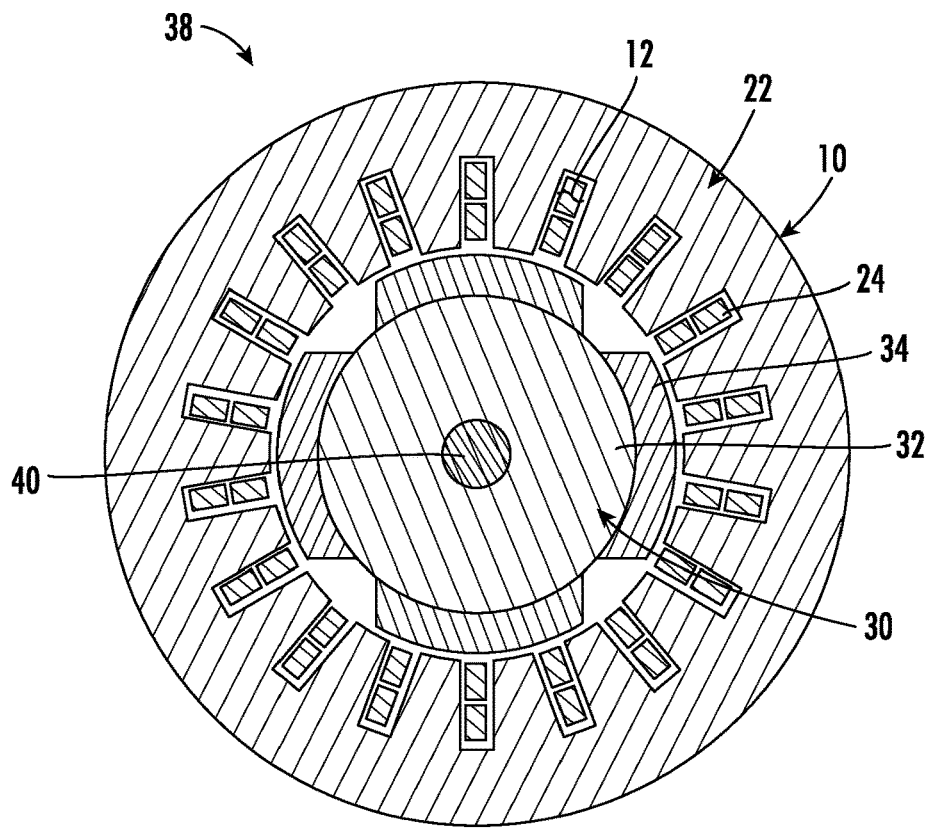
FIG. 6 is a cross-sectional view of the electric machine of FIG. 5 taken along the line VI-VI.

As is depicted, the method 200 includes at (202) forming a stator core 10 (FIG. 4) and a rotor 30 (FIG. 4). As provided herein, the stator core 10 and the rotor 30 may be formed through any practicable method. Moreover, the stator may be positioned outwardly and/or inwardly of the rotor 30 in various embodiments.

At (204), the method includes forming a winding 24 (FIG. 8A) having a channel 44 defined through at least a portion thereof. As provided herein, one or more turbulators 54 are positioned within the channel 44. The turbulators 54 may be configured to alter a pressure, altering a flow rate, change a flow from a laminar flow to a turbulent flow (or vice versa), increase the surface area of the channel 44 along the winding 24 thereby increasing heat rejection properties of the winding 24, etc.

As provided herein, the winding 24 may be formed through an additive manufacturing process such that the one or more turbulators 54 are integrally formed with a portion of the winding 24. In various examples, the additive manufacturing process may allow for the method to include forming at least partially vertically aligned first and second sections 80, 82 of the turbulator 54 at step (206). A gap 84 is defined between the first and second sections 80, 82 of the turbulator 54. When produced in an additive manufacturing process, one of the first or second section 80, 82 of the turbulator 54 may be formed prior to the remaining first or second section 80, 82 of the turbulator 54.

At step (208), the method may include operably coupling the winding 24 to the stator core 10 or the rotor 30. Once the winding 24 is coupled with one of the stator core 10 of the rotor 30, the method at step (210) can include fluidly coupling a cooling system 42 to the channel 44. In some instances, the method at step (212) can include fluidly coupling a cooling system 42 to the channel 44 includes coupling a supply line 46 to one end portion of the winding 24 and a return line 48 to a second end portion of the winding 24.

By operating in accordance with one or more of these aspects, the electric machine provided in FIGS. 1-13C and/or the method 200 provided in FIG. 14 may provide for a more efficient electric machine due to the lowered operating temperature. The electric machine may, therefore, be capable of producing more electric power when operated as a generator and/or more efficiently use electric power when operated as a motor.

Further aspects of the present disclosure may be provided in the following clauses:

An electric machine comprising: a stator core defining a plurality of core slots in a surface thereof; a winding housed in at least one of the plurality of core slots, the winding defining a channel through at least a portion thereof; a cooling system operably coupled with the channel and configured to move a cooling fluid through the channel; and a turbulator positioned within the channel, wherein the turbulator is within a flowpath of the cooling fluid.

The electric machine of one or more of these clauses, further comprising: a controller operably coupled to the cooling system and configured to actuate a pump assembly of the cooling system.

The electric machine of one or more of these clauses, wherein the turbulator includes a first turbulator separated from a first side portion of the channel by a first distance and a second turbulator separated from an opposing second side portion of the channel by a second distance.

The electric machine of one or more of these clauses, wherein the first distance is generally equal to the second distance.

The electric machine of one or more of these clauses, wherein the turbulator is integrally formed with the winding.

The electric machine of one or more of these clauses, wherein the turbulator includes a first turbulator having a first width and a second turbulator having a second width.

The electric machine of one or more of these clauses, wherein the first width is generally equal to the second width.

The electric machine of one or more of these clauses, wherein the first width is greater than the second width.

The electric machine of one or more of these clauses, wherein the turbulator includes a first section extending from an upper portion of the channel and a second section extending from a bottom portion of the channel, wherein the first and second sections define a gap therebetween.

The electric machine of one or more of these clauses, wherein the first and second sections are vertically offset from one another.

The electric machine of one or more of these clauses, wherein the gap defined between the first and second sections is asymmetrical relative to a centerline of the channel.

The electric machine of one or more of these clauses, wherein the turbulator includes a first section extending from an upper portion of the channel and a second section extending from a bottom portion of the channel, wherein the first and second sections define a gap therebetween.

The electric machine of one or more of these clauses, wherein the turbulator includes a plurality of turbulators having a first pair of rows arranged on a linear portion of the winding separated by a first length generally along a cooling fluid flowpath direction and a second pair of rows arranged on a curved portion of the winding separated by a second length generally along the cooling fluid flowpath direction, wherein the first and second lengths may be generally equal.

A method of manufacturing an electric machine having a stator core and a rotor, the method comprising: forming a winding for the stator core of the electric machine having a channel defined through at least a portion thereof, wherein forming the winding further includes integrally forming one or more turbulators within the channel.

The method of one or more of these clauses, further comprising: operably coupled the winding to one of the stator core or the rotor; and fluidly coupling a cooling system to the channel, wherein fluidly coupling the cooling system to the channel includes coupling a supply line to one end portion of the winding and a return line to a second end portion of the winding.

The method of one or more of these clauses, wherein forming the one or more turbulators within the channel further includes forming at least partially vertically aligned first and second sections of the one or more turbulators, wherein a gap is defined between the first and second sections of the one or more turbulators.

A winding for an electric machine comprising: an elongated body, wherein the elongated body is configured to be operably coupled with at least one of a stator or a rotor; a channel defined by the elongated body and extending through at least a portion of the elongated body; and a turbulator positioned within the channel, wherein the turbulator is within a cooling fluid flowpath through the channel.

The winding for an electric machine of claim 17, wherein the channel is operably coupled with a cooling system configured to move a cooling fluid through the channel.

The winding for an electric machine of claim 17, wherein the turbulator includes a first turbulator and an offset second turbulator.

The winding for an electric machine of claim 19, wherein each of the first and second turbulators include a first section extending from a first portion of the channel and a second section extending from a second portion of the channel, the first and second portions separated by a gap.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric machine comprising:
   a stator core defining a plurality of core slots in a surface thereof;
   a winding housed in at least one of the plurality of core slots, the winding defining a channel through at least a portion thereof;
   a cooling system operably coupled with the channel and configured to move a cooling fluid through the channel; and
   a first turbulator positioned within the channel and within a flowpath of the cooling fluid, the first turbulator including a first section extending from an upper portion of the channel and a second section extending from a bottom portion of the channel, wherein the first and second sections of the first turbulator define a first gap therebetween, and wherein one of the first section or the second section extends beyond a vertical midpoint of the channel.

2. The electric machine of claim 1, further comprising:
   a controller operably coupled to the cooling system and configured to actuate a pump assembly of the cooling system.

3. The electric machine of claim 1, further comprising:
   a second turbulator positioned within the channel and within a flowpath of the cooling fluid, the second turbulator including a first section extending from the upper portion of the channel and a second section extending from the bottom portion of the channel, wherein the first and second sections of the second turbulator define a second gap therebetween.

4. The electric machine of claim 3, wherein the second gap is vertically offset from the first gap.

5. The electric machine of claim 3, wherein the first gap is positioned on a first side of the vertical midpoint of the channel and the second gap is positioned on a second, opposing side of the vertical midpoint of the channel.

6. The electric machine of claim 3, wherein the first turbulator defines a first width and the second turbulator defines a second width.

7. The electric machine of claim 6, wherein the first width is generally equal to the second width.

8. The electric machine of claim 6, wherein the first width is greater than the second width.

9. The electric machine of claim 3, wherein the first turbulator is separated from a first side portion of the channel by a first distance and the second turbulator separated from an opposing second side portion of the channel by a second distance.

10. The electric machine of claim 3, wherein the first section of the first turbulator extends vertically below the second gap.

11. The electric machine of claim 3, wherein the first turbulator is positioned a first distance from a first side portion of the channel and the second turbulator is positioned a second distance from a second, opposing side portion of the channel, and wherein the first distance is varied from the second distance.

12. The electric machine of claim 1, wherein the first turbulator is at least partially hollow.

13. The electric machine of claim 1, wherein a height of the first gap is less than 15% of a total height between the upper and bottom portions of the channel.

14. A method of manufacturing an electric machine having a stator core and a rotor, the method comprising:
   for the stator core of the electric machine, additively forming a winding having a channel defined through at least a portion thereof and one or more turbulators within the channel, each of the one or more turbulators including a first section extending from an upper portion of the channel and a second section extending from a bottom portion of the channel,
   wherein one of the first or the second section of the one or more turbulators is formed prior to a remaining first or second section of the respective turbulator.

15. The method of claim 14, further comprising:
   operably coupling the winding to one of the stator core or the rotor; and
   fluidly coupling a cooling system to the channel, wherein fluidly coupling the cooling system to the channel includes coupling a supply line to one end portion of the winding and a return line to a second end portion of the winding.

16. A winding for an electric machine comprising:
   an elongated body, wherein the elongated body is configured to be operably coupled with at least one of a stator or a rotor;
   a channel defined by the elongated body and extending through at least a portion of the elongated body; and
   first and second turbulators respectively positioned laterally adjacent along a cooling fluid flowpath through the channel within a first row, wherein a first width of the first turbulator is varied from a second width of the second turbulator, and wherein the first and second turbulators are varied in width from a third turbulator positioned in a second row downstream of the first row.

17. The winding for an electric machine of claim 16, wherein the channel is operably coupled with a cooling system configured to move a cooling fluid through the channel.

18. The winding for an electric machine of claim 16, wherein the first turbulator is positioned a first distance from a first side portion of the channel and the second turbulator is positioned a second distance from a second, opposing side portion of the channel, and wherein the first distance is varied from the second distance.

19. The winding for an electric machine of claim 18, wherein each of the first and second turbulators includes a first section extending from a first portion of the channel and a second section extending from a second portion of the channel, the first and second portions separated by a gap.

* * * * *